United States Patent [19]
Reid et al.

[11] Patent Number: 4,503,177
[45] Date of Patent: Mar. 5, 1985

[54] STABILIZATION OF PHOTOCHROMIC COMPOUNDS, AND THE USE OF STABILIZED PHOTOCHROMIC COMPOUNDS

[75] Inventors: Paul I. Reid, St. Austell; Brian R. Waters, Par, both of England

[73] Assignee: English Clays Lovering Pochin & Co., Ltd., St. Austell, England

[21] Appl. No.: 395,700

[22] Filed: Jul. 6, 1982

[30] Foreign Application Priority Data

| | | | |
|---|---|---|---|
| Jul. 16, 1981 | [GB] | United Kingdom | 8121910 |
| Sep. 7, 1981 | [GB] | United Kingdom | 8127042 |
| May 14, 1982 | [GB] | United Kingdom | 8214167 |

[51] Int. Cl.$^3$ ........................ C09D 11/00; C09K 5/34
[52] U.S. Cl. ........................................ 524/87; 106/21; 106/287.17; 106/287.2; 106/287.21; 524/89; 524/104; 524/112; 524/447; 252/600
[58] Field of Search ..................... 106/193, 287.17, 21; 252/600; 430/338; 524/447, 87, 112, 89, 104; 542/441

[56] References Cited

U.S. PATENT DOCUMENTS

| | | | |
|---|---|---|---|
| 3,322,542 | 5/1967 | Ullman | 430/338 |
| 3,377,170 | 4/1968 | Giddings | 430/338 |
| 3,825,427 | 7/1974 | Inoue et al. | 430/338 |
| 4,012,232 | 3/1977 | Uhlmann et al. | 106/308 B |
| 4,026,883 | 5/1977 | Farber | 106/21 |
| 4,145,536 | 3/1979 | Holler | 542/441 |

OTHER PUBLICATIONS

Chem. Abstract, 92:50102e, Plessey, May 2, 1979.

*Primary Examiner*—Theodore Morris
*Attorney, Agent, or Firm*—Stefan J. Klauber

[57] ABSTRACT

The stabilization of selected photochromic compounds, selected from certain fulgides and fulgimides, is made possible by associating with such compounds a clay mineral having an expanding crystal lattice, which can stabilize a selected photochromic compound in a higher-energy colored form. The stabilized photochromic compound may be one included in a coating composition, such as a paper coating composition, or may constitute or be incorporated in a filler for a papermaking furnish or for a plastics material. The stabilizer serves to maintain the photochromic compound in its higher-energy colored state or one of its higher-energy colored states, thereby tending to prevent deterioration of color as the photochromic compound converts to an uncolored or weakly colored lower-energy state.

9 Claims, No Drawings

STABILIZATION OF PHOTOCHROMIC COMPOUNDS, AND THE USE OF STABILIZED PHOTOCHROMIC COMPOUNDS

This invention relates to the stabilisation of a higher-energy coloured state of a photochromic compound, particularly, but not exclusively, when the photochromic compound is incorporated in a paper coating composition, or constitutes or is incorporated in a filler.

By "stabilisation" of a higher-energy coloured state of a photochromic compound is meant the extension of the lifetime of the higher-energy coloured state beyond that which is observed when the photochromic compound is used alone (i.e. without a stabilizer) in the same application. In the Examples set out later in this specification, it is shown that a greatly increased resistance of the higher-energy coloured state to fading is achieved when a clay mineral having an expanding crystal lattice is intimately associated with the photochromic compound.

According to "Photochromism Technique in Chemistry", Vol. III, Ed. G. H. Brown, Wiley-Interscience, page 2, photochomism is defined as a reversible change of a single chemical species between two states having distinguishably different absorption spectra, such change being induced in at least one direction by the action of electromagnetic radiation. The inducing radiation, as well as the changes in the absorption spectra, are usually in the ultraviolet, visible or infrared regions.

Photochromic compounds may be inorganic or organic. Some inorganic photochromic compounds are used in glasses e.g. spectacle lenses, which undergo a change in colour when acted upon by radiation of a given frequency, the change being reversed when the irradiating source is removed or when the glass is exposed to radiation of a different frequency.

However organic photochromic compounds have hitherto been found to be less useful, because, although irradiation at one frequency produces a colour change, and irradiation at a second frequency, which is often in the visible range, reverses the change, it is observed that after repeated reversals the colour change with many organic photochromic compounds become progressively weaker in intensity and eventually disappears altogether. The reasons for this is that, with many organic photochromic compounds, there is more than one route by which the compound may be transformed from a higher-energy coloured state to a lower-energy state. Thus, for example, a higher-energy state may revert to a lower-energy state by a thermal process in the dark. In addition, conversion can take place in the dark to a third, uncoloured form, and this reaction is usually irreversible. It is this last reaction which is generally responsible for the process known as "fatigue" in which the colour change becomes progressively less pronounced.

If the photochromic compound could be associated with a material which stabilised a higher-energy form once it had been formed by irradiation, then the photochromic compound could be made to record a more permanent image. For example, the photochromic compound with its associated stabilising material could be incorporated in a paper coating composition and coated on to a suitable base paper. An image could then be formed on the coated paper by irradiating selected portions of the surface of the paper with electromagnetic radiation of the appropriate wavelength, leaving other portions of the paper surface unirradiated, and the stabilising material would prevent the image from fading, for instance on exposure to visible light. Generally, in the absence of such a stabilising material, any image formed by irradiation with electromagnetic radiation would change rapidly to a lower-energy coloured form or to a third, uncoloured form when exposed to visible light. In theory, the image formed when paper coated with a composition containing a photochromic compound and a stabilising material is irradiated with electromagnetic radiation of the appropriate wavelength would have very good definition because the colour change occurs on a molecular level. Also the colour change observed as the photochromic compound passes from one energy state to another shows a broad "grey range" or range of intermediate colour shades.

According to one aspect of the present invention, there is provided, in association, a selected photochromic compound and, as a stabilizer for that compound in a higher-energy coloured form, a clay mineral having an expanding crystal lattice, the selected photochromic compound being a fulgide or fulgimide and having the following general formula:

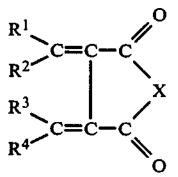

where X is >O or >N—R; R is a hydrogen atom or an alkyl, aryl or aralkyl group; and each of $R^1$, $R^2$, $R^3$ and $R^4$, which may be the same or different, is a hydrogen atom or an alkyl, aryl or heterocyclic group, provided that not more than one of $R^1$ and $R^2$ is a hydrogen atom and not more than one of $R^3$ and $R^4$ is a hydrogen atom, or one but not both of the groups

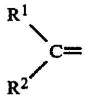 and 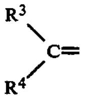

represents an adamantylidene group.

Fulgides are derivatives of succinic acid or succinic anhydride, and fulgimides are derived from succinimide.

The heterocyclic group ($R^1$, $R^2$, $R^3$ or $R^4$) may be, for example, a furyl, a benzofuryl, a thiophenyl or a benzothiophenyl group as described in British Patent Specification No. 1,464,603.

The adamantylidene group may be introduced into the photochromic compound by means of a Stobbe condensation reaction between a succinate diester and adamantan-2-one as described in British Patent Specification No. 2002752A. Adamantan-2-one may be prepared by free radical hydroxylation of adamantane using peracetic acid and ultraviolet radiation to produce adamantan-2-ol and by oxidation of the adamantan-2-ol to adamantan-2-one using a chromic acid/sulphuric acid mixture. Alternatively the adamantane may be oxidised directly to adamantan-2-one.

Adamantane is a tricyclodecane having a rigid, strain free cage structure which may be synthesised from dicyclopentadiene.

Another aspect of the present invention provides a coating composition comprising a selected photochromic compound and, as a stabilizer for that compound in a higher-energy coloured form, a clay mineral having an expanding crystal lattice, the photochromic compound being selected from the fulgides and fulgimides defined hereinabove.

The coating composition of the present invention may be coated on a substrate comprising cellulose material such as paper or cardboard.

A further aspect of the present invention provides a process for stabilizing a selected photochromic compound in a higher-energy coloured form, which comprises associating, with the photochromic compound selected from the fulgides and fulgimides defined hereinabove, a clay mineral having an expanding crystal lattice.

A further aspect of the present invention provides a process for producing a stabilizable coating composition which includes a photochromic compound selected from the fulgides and fulgimides defined hereinabove, which process comprises incorporating in the composition, as a stabilizer for the photochromic compound in a higher-energy coloured form, a clay mineral having an expanding crystal lattice.

The clay mineral which acts as stabilizer is preferably a clay of the smectite group, for example montmorillonite, bentonite, fuller's earth, saponite or hectorite. The clay mineral may be modified by exchanging the cations already present in the clay mineral for cations which are more advantageous in stabilizing the photochromic compound. Alternatively, or in addition, the clay mineral may be treated with a strong acid in order to remove some of the alumina or heated to remove substantially all of the chemically combined water. Alternatively the clay mineral may be treated with a substantially water-insoluble hydroxy polymer of a di- or multivalent metal as described in our British Patent Specification No. 1,572,351 (Application No. 21216/76).

It is possible, with the present invention, to use a clay mineral which has an expanding crystal lattice in its untreated state but which has been treated in such a way that the aluminosilicate layers which make up the lattice are collapsed together or fixed at a particular spacing. Examples of this are the product of treating a clay mineral having an expanding crystal lattice with a substantially water-insoluble hydroxy polymer of a di- or multivalent metal, or the product of heating the clay mineral so that interlayer water is driven off. The former product has a "fixed" crystal lattice and the latter product has a collapsed lattice.

Certain groups of the photochromic compounds employed in the present invention may be modified to improve the chemical bonding of the photochromic compound with, for example, hydroxyl or amino groups of the mineral layer or of the exchangeable cation of the clay mineral.

The coating composition of the present invention may be applied to a substrate comprising cellulosic material such as paper or cardboard, in which case the coating composition can conveniently also contain an adhesive to bind the photochromic compound and the clay mineral to the substrate. It may also contain other inorganic or organic pigments and/or additives.

An image may be formed, on paper coated with a coating composition in accordance with the present invention, by means of a lamp emitting light of the appropriate wavelength and a suitable mask or by means of a moving spot laser source producing a narrow beam of high intensity radiation of the appropriate wavelength.

A multicoloured image may be produced by coating a sheet of paper with a composition or compositions containing two or more photochromic compounds which exhibit different colours in a higher-energy coloured form, and which are converted from a lower-energy form to the higher-energy form by radiation of a different wavelength. Such an arrangement could be used in multicolour printing processes. Alternatively, a coloured image of good definition could be produced by disposing on the surface of a coated paper an array of minute, discrete spots, uniformly arranged, of each of two or more photochromic compounds giving appropriate colours in a higher-energy form, and developing each colour with radiation of a different wavelength.

In certain circumstances it may be possible to use radiation of a different wavelength or band of wavelengths to erase an image which has been formed on the surface of a substrate coated with a coating composition in accordance with the present invention.

A yet further aspect of the present invention provides a filler, for example for a papermaking furnish or for a plastics composition, which filler comprises a photochromic compound selected from the fulgides and fulgimides defined hereinabove, and, as a stabilizer for the photochromic compound in a higher-energy coloured form, a clay mineral having an expanding crystal lattice.

The remarks made hereinabove in relation to the photochromic compound and to the stabiliser when in association or when in a coating composition are also applicable to the photochromic compound and stabiliser when incorporated in, or constituting, the filler.

The stabilising clay mineral with its associated photochromic compound may be used as the sole filler in a papermaking furnish or in a plastics composition or may be used in conjunction with another filler such as talc, calcium carbonate, titanium dioxide, barium sulphate or a non-expanding clay mineral such as kaolin.

Plastics compositions into which the mixture of photochromic compound and stabilising clay mineral may be introduced include transparent or translucent glassy material such as unsaturated polyester resins. Such a composition may be used as a coloured transparent sheet material by itself or as a coating on another plastics material to form signs or decorative displays. Other applications include glass-reinforced polyester sheet moulding compositions and any thermosetting compositions which cross-link at or near room temperature such as certain epoxy resins and polyurethanes. The photochromic compound should generally not be exposed to a temperature greatly in excess of room temperature because this could cause the photochromic compound to pass irreversibly into an uncoloured form. The mixture of photochromic compound and clay mineral may also be used in a coating composition, especially for anti-blocking purposes on film materials such as cellulose acetate or polyethylene terephthalate.

Another aspect of the present invention provides a papermaking furnish including a filler which comprises, in association, a photochromic compound selected from the fulgides and fulgimides defined hereinabove, and, as a stabiliser for that compound in a higher-energy coloured form, a clay mineral having an expanding crystal lattice.

A further aspect of the present invention provides a plastics composition including a filler which comprises, in association, a photochromic compound selected from the fulgides and fulgimides defined hereinabove, and, as a stabiliser for that compound in a higher-energy coloured form, a clay mineral having an expanding crystal lattice.

The present invention will now be illustrated by the following Examples.

EXAMPLE 1

A particular fulgide photochromic compound can exist in any one of the following three forms according to the nature of the radiation to which it is exposed:

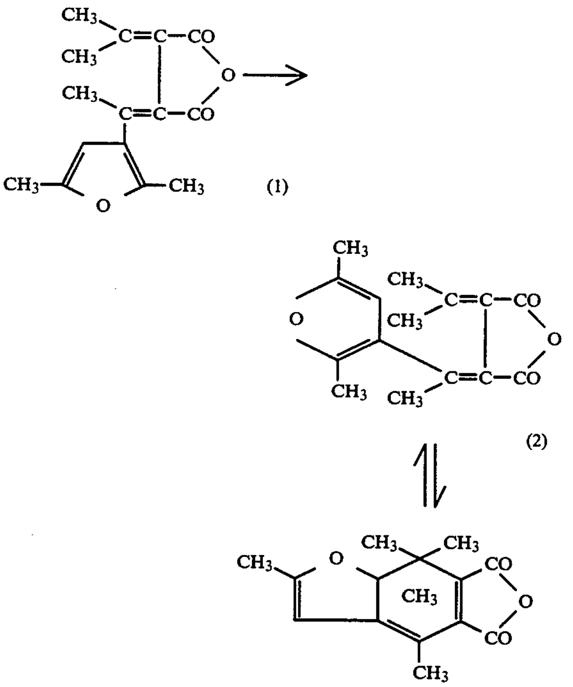

(1)

(2)

(3)

Form (1) is converted to the isomeric form (2) by ultraviolet or thermal radiation. Form (2) has a yellow colour. On further treatment with ultraviolet radiation form (2) is transformed to the red-coloured form (3). Form (3) reverts to form (2) in white light.

Various clays A to G were air-dried and 0.1 g samples of each clay were mixed with sufficient water to form a paste which would just flow from the end of a glass rod and the clay/water mixture was then spread by means of a glass rod on to a glass plate to form a film, which after being allowed to dry in air had a thickness of approximately 5 microns. The dry film was then treated with a mixture consisting of 4 ml of an organic solvent and 0.05 g of the fulgide photochromic compound. In the case of clays A, B and C the organic solvent was diisopropylnaphthalene of which 70% by weight was the 1,3 isomer and 30% by weight was a mixture of 1,5 and 1,6 isomers. In the case of clays D to G the organic solvent was toluene. After standing for 16 hours, the clay film with adsorbed photochromic compound was washed with the organic solvent until the washings appeared substantially colourless in order to remove unadsorbed photochromic compound from the clay. The film was then allowed to dry in air. In each case the dry film was irradiated with ultraviolet radiation of wavelength 366 nm provided by a mercury vapour lamp. The glass plate bearing the film was then allowed to stand in green light. The colour of the film before irradiation, immediately after irradiation, and 1 hour and 1 day respectively after irradiation was observed and the results are shown in the following Table:

TABLE

| | Colour of film | | | |
|---|---|---|---|---|
| Clay | Before irradiation | Immediately after irradiation | 1 hour after irradiation | 1 day after irradiation |
| A | Yellow | Dark Purple | Purple | Purple |
| B | Yellow | Mauve | Mauve | Slight fading |
| C | Yellow | Mauve | Mauve | Slight fading |
| D | Yellow | Dark Purple | Dark Purple | Light Purple |
| E | Yellow | Dark Purple | Dark Purple | Mauve/ Yellow spots |
| F | Yellow | Purple | Purple | Mauve |
| G | Lime Green | Dark Purple | Purple | Red |

Clay A was a Texas bentonite having a particle size distribution such that 100% by weight consisted of particles having an equivalent spherical diameter smaller than 10 microns, 86% by weight consisted of particles having an equivalent spherical diameter smaller than 2 microns and 73% by weight consisted of particles having an equivalent spherical diameter smaller than 1 micron. Before use, the clay was washed with a solution of calcium chloride so that substantially all of the replaceable cations were $Ca^{++}$ ions.

Clay B was prepared by washing the same Texas bentonite as was used to prepare Clay A, but this time in a solution of aluminium chloride hexahydrate in order to replace substantially all of the replaceable cations by $Al^{3+}$ ions.

Clay C was prepared by washing the same Texas bentonite as was used to prepare Clay A, but this time with hydrochloric acid in order to replace substantially all of the replaceable cations by $H^+$ ions.

Clays D and E consisted predominantly of saponite.

Clay F was a hectorite clay.

Clay G was a synthetic hectorite manufactured by Laporte Industries Limited under the trade name "LAPONITE".

In each case the clay stabilised the photochromic compound in the higher-energy form (3) which on the clay appeared purple rather than red. In the absence of the clay the higher-energy form (3) would revert rapidly in green light to the lower-energy yellow form (2).

It has been observed that, when the cations present in the clay mineral are predominantly calcium and magnesium ions, the stabilising effect is especially marked. When sodium, lithium or hydrogen ions predominate, the stabilisation effect is much less pronounced, and the effect when aluminium ions predominate is intermediate between the effects obtained with the di- and monovalent cations.

The hue of the colour produced by form (2) of the photochromic compound is also affected by the cations(s) present in the clay mineral. It was found that when the cations in the bentonite associated with the photochromic compound were predominantly calcium the hue produced by irradiation of the photochromic compound with ultraviolet radiation was purple or blue, depending upon the moisture content of the bentonite, whereas the hue produced on irradiation when the photochromic compound was associated with a bentonite in which the cations were predominantly aluminium or hydrogen was mauve.

It should be noted that the foregoing Table also demonstrates that the nature of the mineral species also affects both the stability and the hue of form (3) of the photochromic compound. For example, hectorite and saponite give differing results.

EXAMPLE 2

A paper coating composition was prepared according to the following formulation:

| Ingredient | % by weight |
|---|---|
| kaolin | 38 |
| styrene butadiene rubber latex | 15 |
| bentonite/photochromic compound mixture | 47 |

The kaolin had a particle size distribution such that 0.3% by weight consisted of particles having an equivalent spherical diameter larger than 10 microns and 75% by weight consisted of particles having an equivalent spherical diameter smaller than 2 microns.

The latex was in the form of an aqueous suspension containing 50% by weight of solid styrene butadiene rubber.

The bentonite was the same as clay A in Example 1 and the photochromic compound was the same as was used in Example 1. The mixture was prepared by mixing 17 g of clay A with 0.5 g of the photochromic compound suspended in 300 ml of toluene. The mixture was washed with toluene until the washings appeared substantially colourless in order to remove unadsorbed photochromic compound from the clay. The mixture was then allowed to dry in air.

In preparing the paper coating composition, the kaolin clay was first mixed with the quantity of water which was calculated to give a final composition having a solids content of 40% by weight. The latex was then added with agitation and then sufficient 5N sodium hydroxide solution to raise the pH to within the range 9.0–9.5. Finally the bentonite/photochromic compound mixture was added with stirring.

The composition was then diluted with water to a solids content of 11% by weight and coated on to a paper substrate using a draw bar. The coating was then dried in air in the dark.

The coated paper had a pale yellow colour before irradiation but after exposure to ultraviolet radiation of wavelength 366 nm a strong purple colour appeared, and remained after the coated paper had been kept for several hours in a desiccator.

EXAMPLE 3

A finely divided Texas bentonite was washed with a solution of calcium chloride so that substantially all of the replaceable cations were $Ca^{++}$ ions. It was then washed three times, each time with 50 ml of methanol, in order to remove excess calcium chloride, washed two further times, each time with 50 ml of toluene, and finally dried in air. 2 Grams of the calcium bentonite were then mixed with a solution containing 0.5 g of the fulgide photochromic compound, having the chemical formulae shown in Example 1, in 50 ml of toluene, and the mixture was stirred for 30 minutes. The mixture was allowed to stand overnight and was then filtered and washed three times, each time with 50 ml of toluene. The bentonite with its associated photochromic compound was then dried in air.

The Texas bentonite had a particle size distribution such that 100% by weight consisted of particles having an equivalent spherical diameter smaller than 10 microns, 86% by weight consisted of particles having an equivalent spherical diameter smaller than 2 microns and 73% by weight consisted of particles having an equivalent spherical diameter smaller than 1 micron.

One gram of the bentonite/photochromic compound complex was mixed with 3 g of water and the resultant suspension added to a fine paper furnish which had been prepared by dispersing in 6 liters of water 10 g of bleached soft wood kraft pulp and 10 g of bleached hardwood kraft pulp to give a suspension containing 0.33% by weight of dry fibres. There was added to the furnish 0.02% by weight, based on the dry fibre weight, of a cationic polyacrylamide retention aid, and handsheets having a basis weight of 60 $g.m^{-2}$ were prepared by the method specified in TAPPI Standard No. T205 os-71.

The handsheets were dried in air and kept in a desiccator for 16 hours. They were then irradiated with ultraviolet radiation of wavelength 366 nm provided by a mercury vapour lamp. The photochromic compound was converted to form (3) described in Example 1, which, under the conditions of the present experiment, was coloured blue.

It was found that of the handsheets containing the calcium bentonite stabilised photochromic compound were kept in a desiccator with silica gel the form (3) persisted for at least 3 months. If the handsheets were exposed to the ambient conditions of the temperature and humidity in the laboratory the lifetime of form (3) before fading was observed was 10 days. If, however, the handsheets were exposed to an atmosphere of 100% relative humidity the onset of fading was observed after 1 day.

EXAMPLE 4

A solution containing 0.5 g of the same fulgide photochromic compound as was used in Examples 1 and 3 in 50 ml of toluene, was mixed with 2 g of the same calcium bentonite as was used in Example 3 for 30 minutes. The mixture was allowed to stand overnight and the solids were then recovered by filtration, washed three times, each time with 50 ml of toluene and allowed to dry in air.

A transparent sheet plastics composition was prepared according to the following formulation:

| Ingredient | Parts by Weight |
|---|---|
| Unsaturated polyester resin (B.I.P. BEETLE 813) | 100 |
| Methyl ethyl ketone peroxide initiator | 3 |
| Cobalt naphthenate accelerator | 2 |
| Bentonite/photochromic compound complex | 5 |

The composition was cast into a thin sheet and allowed to harden substantially at room temperature. The hardened film was then irradiated with ultraviolet radiation of wavelength 366 nm. The photochromic compound was converted to form (3) referred to in Example 1 which gave a blue colouration in the plastics composition. It was found that the calcium bentonite stabilised the photochromic compound in form (3) for a period of several days.

EXAMPLE 5

A paper coating composition was prepared similar to the formulation given in Example 2. All the ingredients, and their proportions in the formulation, were the same as in Example 2, except that the fulgide photochromic compound which was used in Example 2 was replaced by a fulgimide photochromic compound which can exist in the following two forms which are in equilibrium depending upon the radiation to which they are exposed:

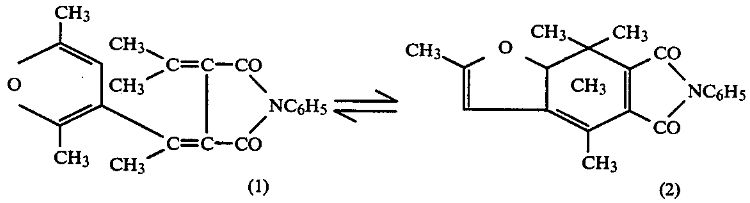

(1) (2)

Form (1) is coloured yellow/orange and is converted to the red-coloured form (2) by ultraviolet radiation of wavelength 366 nm. In the absence of a stabiliser, form (2) reverts to form (1) in white light.

The mixture of bentonite (clay A) and the photochromic compound was prepared as described in Example 2, and the procedures for preparing the paper coating composition and for coating the paper were also exactly the same as were described in Example 2.

The coated paper had a pale orange colour before irradiation but after exposure to ultraviolet radiation of wavelength 366 nm a strong red colour appeared, and remained after the coated paper had been kept for several hours in a desiccator.

EXAMPLE 6

A Wyoming bentonite, in which the replaceable cations were predominantly $Na^+$, had a particle size distribution such that 96% by weight consisted of particles having an equivalent spherical diameter smaller than 2 microns, 89% by weight consisted of particles having an equivalent spherical diameter smaller than 1 micron and 82% by weight consisted of particles having an equivalent spherical diameter smaller than 0.5 micron. Before use, the clay was washed with a solution of calcium chloride so that substantially all of the replaceable cations were $Ca^{++}$ ions. The calcium bentonite was then washed 5 times with water in order to remove substantially all of the free salts.

The calcium bentonite was air dried and 0.1 g of the dry clay was mixed with sufficient water to form a paste which would just flow from the end of a glass rod and the clay/water mixture was then spread by means of a glass rod on to a glass plate to form a film which, after being allowed to dry in air, had a thickness of approximately 5 microns. The dry film was then treated with a mixture consisting of 4 ml of toluene and 0.05 g of the fulgide photochromic compound which was described in Example 1. After standing for 16 hours, the clay film with adsorbed photochromic compound was washed with toluene until the washings appeared substantially colourless. The film was then allowed to dry in air. The dry film, which was initially yellow in colour, was irradiated with ultraviolet radiation of wavelength 366 nm provided by a mercury vapour lamp and a purple/blue colour resulted. This colour showed no sign of fading after the glass plate supporting the film had been left in a desiccator containing silica gel for 3 months and only began to fade after 12 days in the laboratory atmospher.

EXAMPLE 7

A web offset paper coating composition was prepared according to the following formulation:

| Ingredient | Parts by Weight |
|---|---|
| Bentonite/photochromic compound | 100 |
| Styrene butadiene rubber latex | 11 |
| Sodium carboxymethyl cellulose | 0.5 |
| Sodium polyacrylate dispersing agent | 0.3 |

The bentonite was the same as clay A in Example 1 and the photochromic compound and the styrene butadiene latex were the same as used in Example 1. The bentonite/photochromic compound mixture was prepared by mixing 102 g of the bentonite with 3 g of the photochromic compound suspended in 1,800 ml of toluene. The mixture was washed with toluene until the washings appeared substantially colourless. The mixture was then allowed to dry in air.

In preparing the paper coating composition the bentonite/photochromic compound mixture was first mixed with a solution of the dispersing agent in the quantity of water which was calculated to give a final composition having a solids content of 66% by weight. The latex and the sodium carboxymethylcellulose were then added with agitation and then sufficient 5N sodium hydroxide solution to raise the pH to within the range 9.0–9.5.

The composition was then coated on to a paper substrate using a laboratory paper coating machine of the type described in British Patent Specification No. 1,032,536 and the coating dried in air in the dark.

The coated paper had a pale yellow colour before irradiation, but, after exposure to ultraviolet radiation of wavelength 366 nm, a strong purple colour appeared and remained after the coated paper had been kept for one month in a desiccator with silica gel.

EXAMPLE 8

A gravure paper coating composition was prepared according to the following formulation:

| Ingredient | Parts by Weight |
|---|---|
| Bentonite/photochromic compound | 100 |
| Alkali swellable acrylic latex | 4.8 |
| Sodium polyacrylate dispersing agent | 0.3 |

The bentonite/photochromic compound mixture was prepared as described in Example 7 and the same bentonite and the same photochromic compound were used.

The bentonite/photochromic compound mixture was first mixed with a solution of the dispersing agent in the quantity of water which was then calculated to give a final composition having a solids content of 55% by weight. The latex was then added with agitation and the sufficient 5N sodium hydroxide solution to raise the pH to 8.5.

The composition was then coated on to a paper substrate and the coating dried as described in Example 7.

The coating paper had a pale yellow colour before irradiation, but, after exposure to ultraviolet radiation of wavelength 366 nm, a strong purple colour appeared and remained after the coated paper had been kept for one month in a desiccator with silica gel.

We claim:

1. In association, a selected photochromic compound and, as a stabilizer for that compound in a higher-energy coloured form, a clay mineral having an expanding crystal lattice, the selected photochromic compound being a fulgide or fulgimide and having the following general formula:

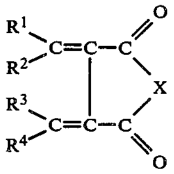

where X is >O or >N—R; R is a hydrogen atom or an alkyl, aryl or aralkyl group; and each of $R^1$, $R^2$, $R^3$ and $R^4$, which may be the same or different, is a hydrogen atom or an alkyl, aryl or heterocyclic group, provided that not more than one of $R^1$ and $R^2$ is a hydrogen atom and not more than one of $R^3$ and $R^4$ is a hydrogen atom, or one but not both of the groups

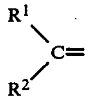 and 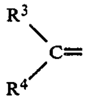

represents an admantylidene group.

2. An association according to claim 1, wherein the clay mineral which acts as stabilizer is a clay of the smectite group.

3. An association according to claim 2, wherein the clay mineral of the smectite group is montmorillonite, bentonite, fuller's earth, saponite or hectorite.

4. An association according to claim 1, wherein the clay mineral is one modified by exchanging cations originally present in the clay mineral with other cations.

5. A process for stabilizing a selected photochromic compound in a higher-energy coloured form, which comprises associating with the photochromic compound a clay mineral having an expanding crystal lattice, the selected photochromic compound being a fulgide or fulgimide having the formula defined in claim 1.

6. A process for producing a coating composition which includes one or more selected photochromic compounds, which process comprises incorporating in the composition an association according to claim 1.

7. A plastics composition including a filler which comprises a selected photochromic compound and, as a stabiliser for that compound in a higher-energy coloured form, a clay mineral having an expanding crystal lattice, the selected photochromic compound being a fulgide or fulgimide having the formula defined in claim 1.

8. An association according to claim 1, wherein X is oxygen and $R^1$, $R^2$, $R^3$ and $R^4$ are each aliphatic or aromatic groups.

9. An association according to claims 1, 2, 4 or 8, which is a coating composition containing an adhesive to bind said photochromic compound and said stabilizer to a substrate.

* * * * *